(12) United States Patent
Song et al.

(10) Patent No.: US 8,421,796 B2
(45) Date of Patent: Apr. 16, 2013

(54) VISUALIZATION FOR MULTIDIMENSIONAL DATA

(75) Inventors: Song Song, Beijing (CN); James Tien-Cheng Yeh, Katonah, NY (US); Jie Xin Jiao, Beijing (CN); Xiao Feng Wang, Beijing (CN); Peng Zhu, Beijing (CN); Ying Wang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 486 days.

(21) Appl. No.: 12/365,931

(22) Filed: Feb. 5, 2009

(65) Prior Publication Data

US 2009/0207166 A1 Aug. 20, 2009

(30) Foreign Application Priority Data

Feb. 15, 2008 (CN) .......................... 2008 1 0005553

(51) Int. Cl.
*G06T 15/00* (2011.01)
*G06T 11/20* (2006.01)
*G09G 5/22* (2006.01)
*G06Q 40/00* (2012.01)
*G06F 7/00* (2006.01)
*G06F 17/30* (2006.01)

(52) U.S. Cl.
USPC ....... 345/419; 345/440; 345/440.2; 705/36 R; 707/790; 707/798

(58) Field of Classification Search ........ 345/440–440.2
See application file for complete search history.

(56) References Cited

U.S. PATENT DOCUMENTS

| 7,499,046 B1 * | 3/2009 | Wright et al. ................. 345/418 |
| 2007/0038543 A1 * | 2/2007 | Weinstein .................. 705/36 R |
| 2009/0027380 A1 * | 1/2009 | Rajan et al. .................. 345/419 |

OTHER PUBLICATIONS

T. Vaupel and V. Hansen, "Electrodynamic analysis of combined microstrip and coplanar/slotline structures with 3-D components based on a surface/volume integral-equation approach," IEEE Trans. Microwave Theory Tech., vol. 47, No. 9, pp. 1788-1800, Sep. 1999.*

* cited by examiner

*Primary Examiner* — David T Welch
*Assistant Examiner* — Matthew D Salvucci
(74) *Attorney, Agent, or Firm* — Douglas A. Lashmit; Hoffman Warnick LLC (57) ABSTRACT

The present invention provides a visualization method and apparatus for multidimensional data. According to an embodiment, there is provided a visualization method for multidimensional data including a plurality of parameters to be viewed which are related to a given object, including: displaying the plurality of parameters to be viewed which are related to a given object in different layers along a Z axis of a 3-D coordinate system, wherein each of the plurality of parameters is displayed in a 2-D plane; determining one of the 2-D planes as an interested plane; and in response to focusing on an object instance of the object by a user, linking and displaying locations of the object instance on other planes.

14 Claims, 7 Drawing Sheets

VISUALIZATION FOR MULTIDIMENSIONAL DATA

TECHNICAL FIELD

The invention relates to an information processing technique, specifically, to a visualization technique for multidimensional data.

TECHNICAL BACKGROUND

Accurate and timely analysis of financial market information such as stock information, bond information, currency information, futures information etc., is essential for profiting in the financial markets. As the volume of financial market information generated by market activity increases, however, it becomes increasingly difficult to analyze all the relevant information in order to take advantage of market movements and trends. A method and system that analyze financial market information and help spot market movements and trends are therefore highly desirable.

Thus, financial market information systems and electronic trading systems have been created which facilitate the trading of all kinds of financial instruments of a financial market, such as stocks, bonds, currencies, futures, and so on. However, it is difficult for existing methods and systems to intuitionally display the relationship among parameters related to financial tools to a user.

Figure 7:
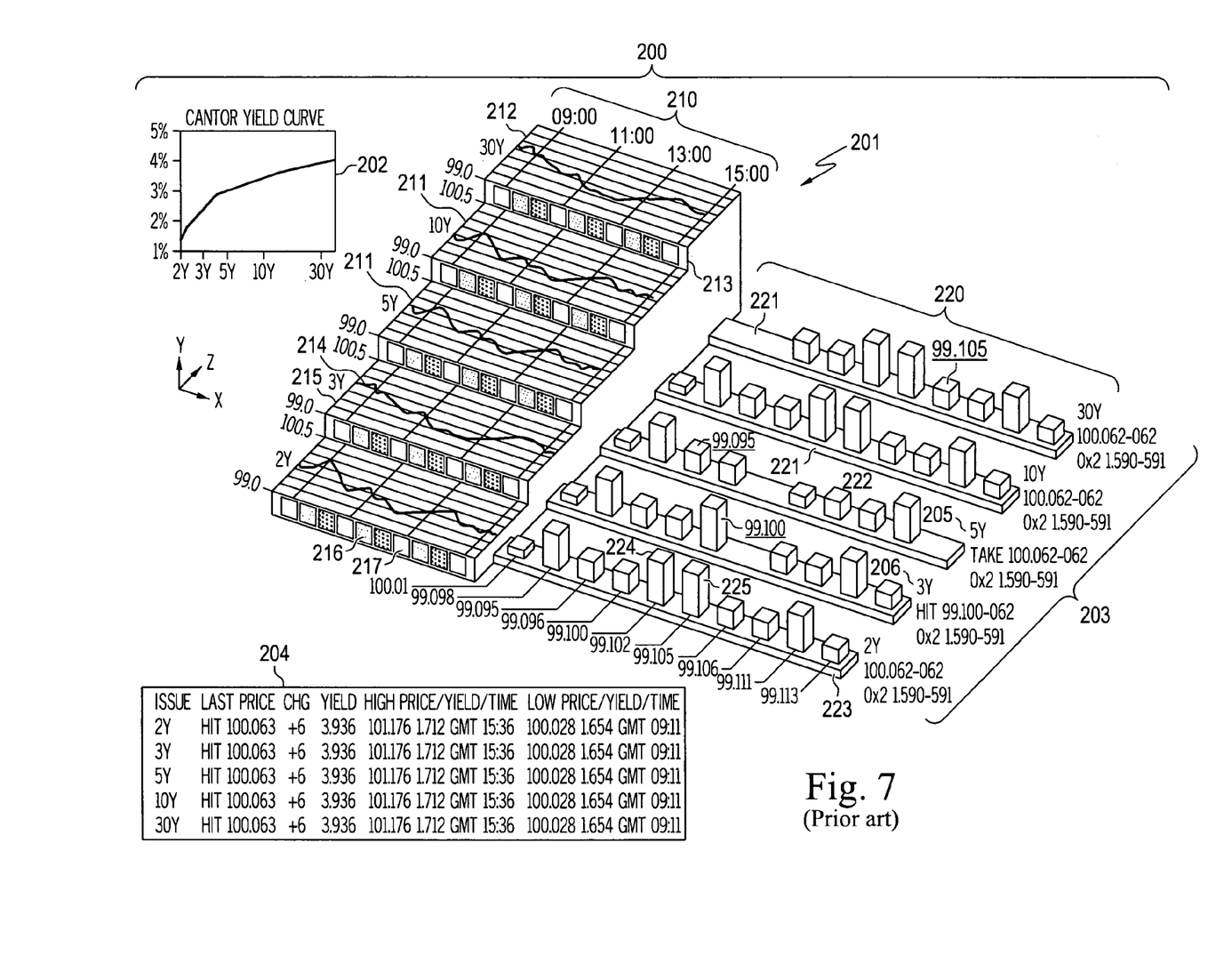
FIG. 7 is a view obtained by a method for displaying financial market information according to the prior art.

For example, a method and system of displaying financial market information are disclosed in US Patent Publication No. US 2007/0038543A1, which can display a plurality of types of finance information in one window. FIG. 7 shows a view obtained by a method for displaying financial market information according to this document, wherein intraday trading activity is shown in first portion 210, and current market conditions and potential market activity such as available trading opportunities are shown in second portion 220. Further, in first portion 210, different financial information is shown in different steps. However, the method and system disclosed by this document can not intuitionally display the relationship among a plurality of financial information.

Therefore, there is a need to provide a visualization method and system for multidimensional data, which can intuitionally display the relationship among parameters related to financial tools in one window or screen.

SUMMARY OF THE INVENTION

The present invention provides a visualization method for multidimensional data and a visualization apparatus for multidimensional data.

According to one aspect of the present invention, there is provided a visualization method for multidimensional data including a plurality of parameters to be viewed which are related to a given object, comprising: displaying the plurality of parameters to be viewed which are related to a given object in different layers along a Z axis of a 3-D coordinate system, wherein each of the plurality of parameters is displayed in a 2-D plane; determining one of the 2-D planes as an interested plane; and in response to focusing on an object instance of the object by a user, linking and displaying locations of the object instance on other planes.

According to another aspect of the present invention, there is provided a visualization apparatus for multidimensional data including a plurality of parameters to be viewed which are related to a given object, comprising: a layering and displaying unit configured to display the plurality of parameters to be viewed which are related to a given object in different layers along a Z axis of a 3-D coordinate system, wherein each of the plurality of parameters is displayed in a 2-D plane; an interested plane determining unit configured to determine one of the 2-D planes as an interested plane; and a linking and displaying unit configured to link and display locations of the object instance on other planes, in response to focusing on an object instance of the object by a user.

Through using the visualization method and apparatus for multidimensional data of the present invention, multidimensional data can be layered and displayed in one window or screen and linked and displayed, the relationship among different parameters of multidimensional data can be intuitionally displayed to a user, and the user can accurately and effectively use and analyze all kinds of information. Furthermore, if the method and apparatus of the present invention are applied in the financial market, it can help the user to accurately analyze financial market movements and trends, and the investment risk of the user is reduced.

BRIEF DESCRIPTION OF THE DRAWINGS

The above features, advantages and objectives of the invention will be better understood through the following description of the implementations of the invention in conjunction with the accompany drawings.

DETAILED DESCRIPTION OF THE INVENTION

In order to be better understood, a number of terms related to the present invention will be explained below.

In the present invention, a so-called "object" is any entity that a user is interested in, such as financial tools (e.g., stocks, funds, bonds, currencies, futures, and so on), all kinds of goods (e.g., books, computers, and so on), or companies in a field and so on, and the present invention has no limitation on this.

Generally, the object has a plurality of object instances. The so-called "object instance" is a specific example of the object. For example, for a stock object, its object instance can be a specific stock name or code, such as a stock of company A, a stock of company B, etc. For a computer as goods, its object instance can be a computer of different brands.

The present invention further relates to a parameter related to the object. The so-called "parameter" is all kinds of parameters that a user is interested in and uses for analyzing and evaluating the object. For example, if the object is a stock as a financial tool, the parameter related to the stock can include price of the stock, daily trading volume of the stock, 52 weeks low of the price of the stock, etc. Further, if the object is a computer as goods, the parameter related to the computer can include price of the computer, main frequency of the computer, monthly trading volume of the computer, monthly lowest price of the computer, etc.

Generally, there are many parameters related to one object, therefore these parameters related to the object may constitute multidimensional data. For example, for the stock object, one parameter (such as the price of the stock) corresponds to a set of data, and this set of data are values of parameters of object instances, for example, stock prices of company A, company B, and so on. Other parameters related to the stock object correspond to a set of data. Therefore, several sets of data corresponding to each object constitute so-called "multidimensional data", wherein each dimension is corresponding to a parameter.

It should be understood that the object, parameter, object instance, and multidimensional data mentioned above are all illustrative, and the present invention have no limitation on the above-mentioned specific examples.

Next, a detailed description of various embodiments of the present invention will be given in conjunction with the drawings.

Visualization Method for Multidimensional Data

Figure 1:
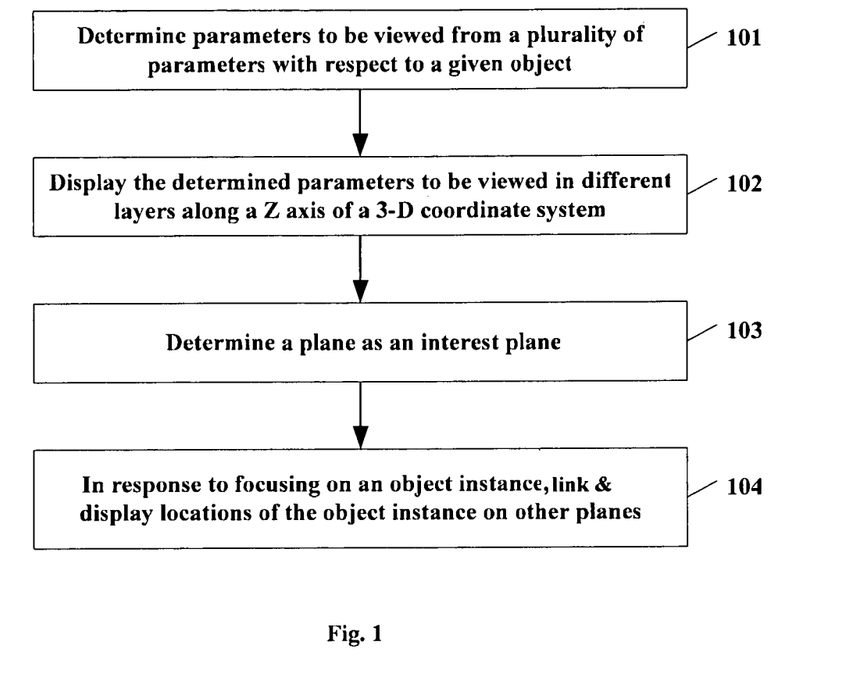
FIG. 1 is a flowchart showing a visualization method for multidimensional data according to the present invention.

FIG. 1 is a flowchart showing a visualization method for multidimensional data according to the present invention. As shown in FIG. 1, first, in step 101, with respect to a given object, parameters to be viewed are determined from a plurality of parameters related to the given object, wherein the parameters to be viewed are parameters that a user is interested in. In this step, parameters that the user is interested in and are to be viewed are selected from the plurality of parameters related to the given object as the parameters to be viewed.

In the embodiment, some parameters are selected from a plurality of preset parameters by the user by a GUI (Graphical User Interface) as the parameters to be viewed. Further, the parameters to be viewed can be stored in a configuration file, and as the method of the present invention runs to the step 101, the parameters to be viewed are automatically read from the configuration file, wherein the configuration file can be edited and stored by the user in advance. The present invention has no limitation on the method of determining the parameters to be viewed in the step 101, and it can be realized by any method known by those skilled in the art.

In the embodiment, the step 101 is an optional step, and in the visualization method for multidimensional data of the present invention, there is no need to select the parameters to be viewed from the plurality of parameters related to the given object, but all parameters related to the given object are used as the parameters to be viewed.

Next, in step 102, the determined parameters to be viewed are displayed in different layers along a Z axis of a 3-D coordinate system, wherein each of the parameters is displayed in a 2-D plane.

In the embodiment, multidimensional data obtained in advance can be stored, wherein dimension data are stored in one list or multidimensional data are stored in one list. As the method of the present invention runs to step 102, a set of data corresponding to each of the parameters to be viewed are read from the list stored in advance according to the parameters to be viewed determined in step 101, each set of data are drawn on a 2-D plane, and the drawn 2-D planes are displayed in different layers along the Z axis of the 3-D coordinate system in one window or screen. It should be understood that in the present invention, any suitable software known by those skilled in the art, can be used to draw a set of data on a 2-D plane, the drawn 2-D planes are displayed in different layers along the Z axis of the 3-D coordinate system in one window by these software, and the present invention has no limitation on this.

Step 102 will be described in detail in conjunction with FIG. 2.

Figure 2:
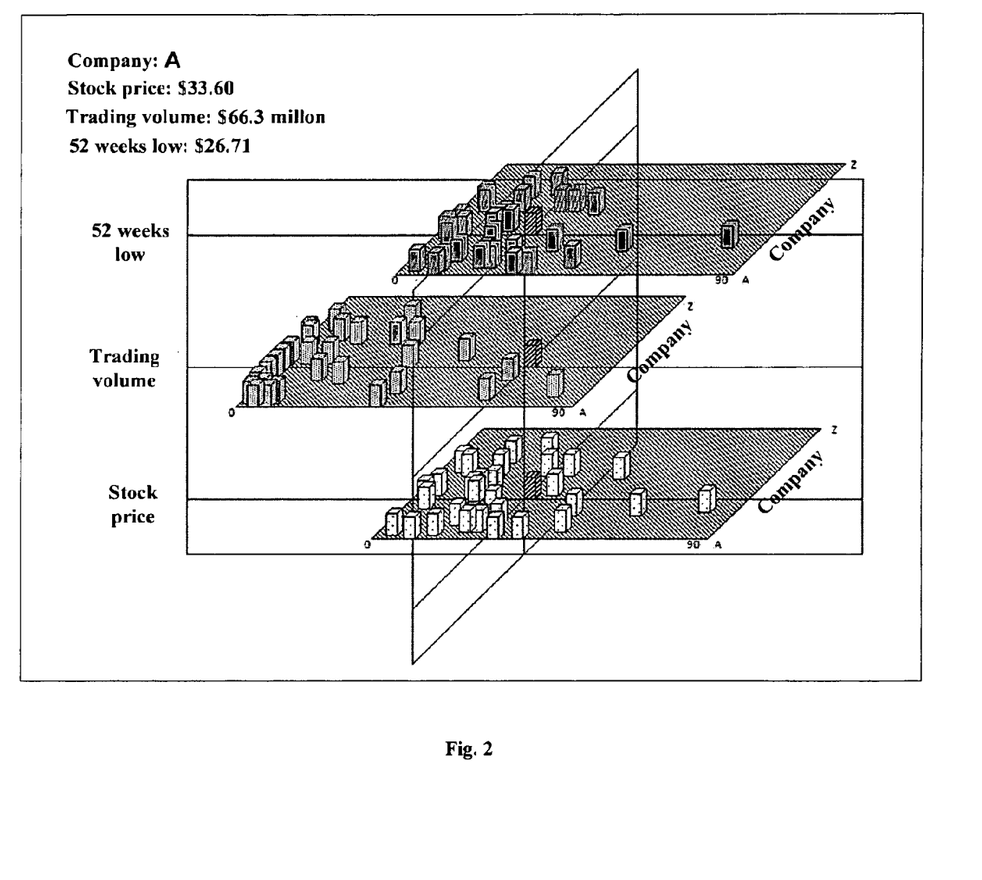
FIG. 2 is an example of a view obtained by a visualization method and apparatus for multidimensional data according to the present invention.

FIG. 2 is an example of a view obtained by a visualization method and apparatus for multidimensional data according to the present invention. As shown in FIG. 2, a stock is used as an example of the object, and price of the stock, daily trading volume, and 52 weeks low on a certain day are selected as the parameters to be viewed.

In step 102, three parameters are respectively displayed on three planes top-down, wherein every post represents a value of a parameter corresponding to an object instance. The X axes respectively denote price of the stock (0-$90), daily trading volume (0-90 million), 52 weeks low (0-$90), and the Y axes denote an object instance, i.e., a name of a company (arranged by the order of letters from A to Z). In the embodiment, a post is used to represent the value of a parameter of an object instance in order that object instances can be easily differentiated in a 2-D plane, and other patterns such as a centrum, a triangle etc., can be used in the present invention.

Furthermore, optionally, in the embodiment, the determined parameters to be viewed can be equalized before step 102, for example price of the stock, daily trading volume, and 52 weeks low of the instance shown in FIG. 2 can be equalized, in order to uniformly distribute them in the figure when displaying them. In the embodiment, any method or software known by those skilled in the art can be used to perform the equalizing, for example the value of the parameter of the object instance can be multiplied by a weight or treated by using a function in a known manner.

Return to FIG. 1, next in step 103, a plane is determined as an interested plane. In the step, a plane is selected from a plurality of planes corresponding to the parameters to be viewed as an interested plane by a user in order to perform the following operations on this plane. For example, in the example of FIG. 2, the plane corresponding to price of the stock can be selected as the interested plane.

Next, in step 104, in response to focusing on an object instance of the object in the interested plane selected by the user, locations of the object instance on other planes are linked and displayed.

Step 104 will be described in detail in conjunction with FIGS. 2-5.

As shown in FIG. 2, after the plane corresponding to price of the stock is determined as the interested plane in step 103, the user can drag the plane with respect to a coordinate plane forward to backward and left to right. As shown in FIG. 2, a plane, which is vertical with the three planes displayed in different layers and angled (e.g., vertical) with the paper plane, is used as the coordinate plane. A longitudinal axis of the coordinate plane is corresponding to the Z axis of the 3-D coordinate system, and a lateral axis of the coordinate plane is each line crossed with each of the three planes displayed in different layers, in which a point of intersection between the longitudinal axis and each lateral axis is a coordinate origin of the coordinate plane on the plane on which the lateral axis is located.

In the embodiment, the user can move the interested plane forward to backward and left to right with respect to the coordinate origin of the coordinate plane on the interested plane, in order to focus the object instance interested by the user on the coordinate origin. For example, in FIG. 2, the user focuses on the stock of company A, i.e., the location of the stock of company A on the interested plane is moved to the coordinate origin of the coordinate plane on the plane of price of the stock.

At the same time, in the embodiment, the locations of the object instance on other planes are linked and displayed. That is to say, while the user moves the interested plane, the other planes are automatically moved by the system, i.e., the plane of daily trading volume and the plane of 52 weeks low are moved in order that the locations of the stock of company A on the plane of daily trading volume and the plane of 52 weeks low are move to the coordinate origins of the coordinate plane on these planes respectively, i.e., the stock of company A in the plane of daily trading volume and the plane of 52 weeks low are move to the coordinate origins of the coordinate plane on these planes.

Further, optionally, in the embodiment, while the interested plane is moved, a parameter value of a parameter to be viewed of an object instance on the coordinate origin can be linked and displayed. For example, in FIG. 2, when the object instance on the coordinate origin is the stock of company A, the company of company A, price of the stock of $33.6, daily trading volume of 66.3 million, and 52 weeks low of $26.71 are linked and displayed in the upper-left corner of the window.

Figure 3:
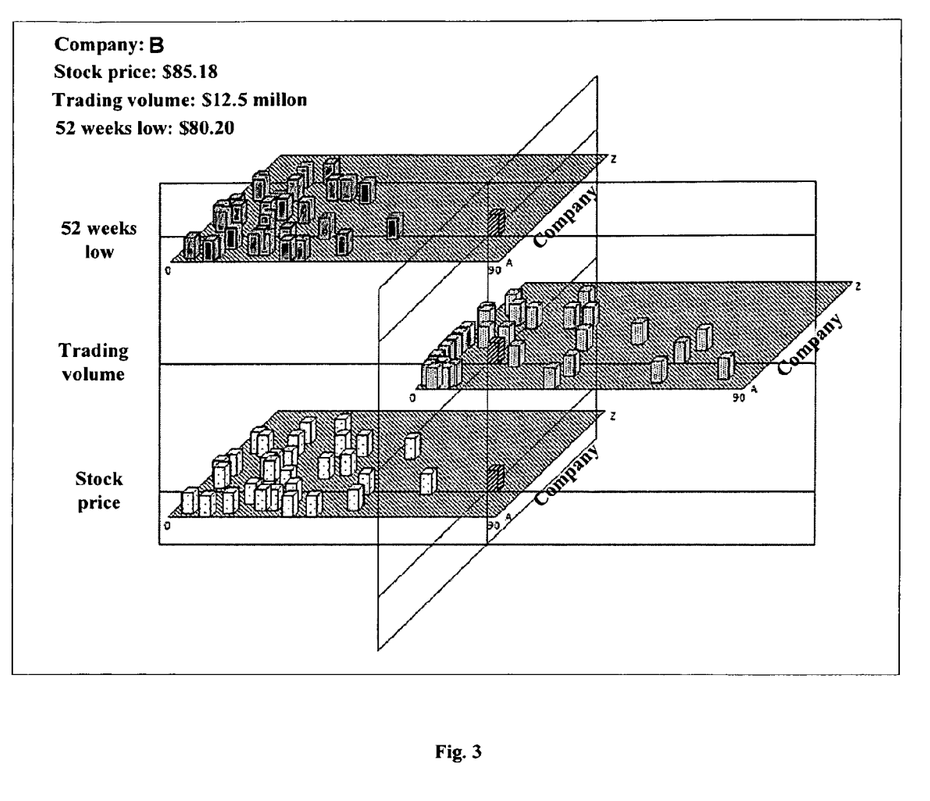
FIG. 3 is another example of a view obtained by a visualization method and apparatus for multidimensional data according to the present invention.

Further, optionally, the plane on which daily trading volume is located can be used as the interested plane. Based on FIG. 2, a view as shown in FIG. 3 is obtained by moving the plane of daily trading volume with respect to the coordinate plane, and moving the object instance to the stock of company B. As shown in FIG. 3, while the daily trading volume of the stock of company B is moved to 12.5 million, the price of the stock of company B is moved to $85.18, and the 52 weeks low of the stock of company B is moved to $80.20.

Figure 4:
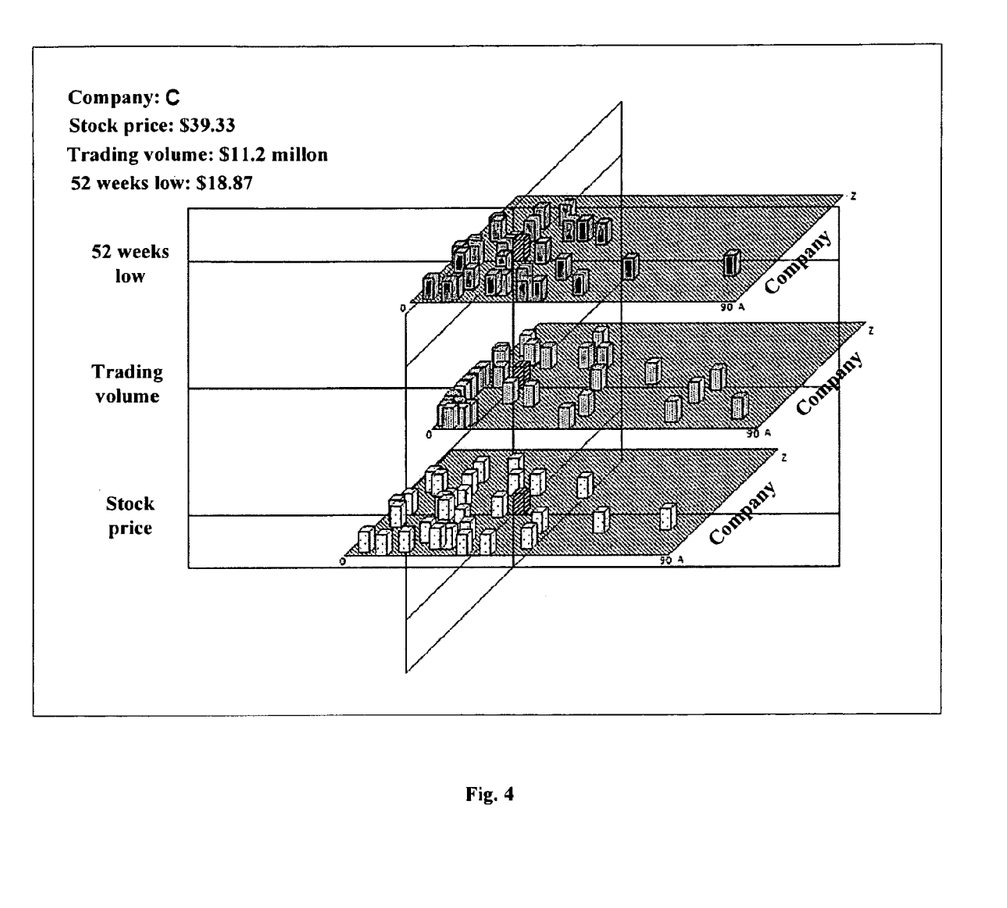
FIG. 4 is another example of a view obtained by a visualization method and apparatus for multidimensional data according to the present invention.

Further, in the embodiment, in step 104, although the interested plane is moved to focus on an object instance, however, the present invention has no limitation on this, and the coordinate plane can be moved to focus on an object instance. For example, based on FIG. 2, a view as shown in FIG. 4 can be obtained by selecting the plane of the price of the stock as the interested plane, and moving the coordinate plane to the right with respect to the interested plane, so as to focus the coordinate origin on the stock of company C the price of which is $39.33. As shown in FIG. 4, while the price of the stock of company C is moved to $39.33, the daily trading volume of the stock of company C is moved to 11.2 million, and the 52 weeks low of the stock of company C is moved to $18.87.

In step 104, in response to focusing on an object instance in the interested plane selected by the user, locations of the object instance on other planes are linked and displayed by moving the interested plane and other planes or moving the coordinate plane and other planes, however, the present invention has no limitation on this, and the present invention can be accomplished in the case that there is not a coordinate plane and there is no need to move planes of parameters to be viewed. Specifically, in the present invention, after the interested plane is determined in step 103, in step 104, an object instance to be focused on is received on the interested plane determined, and locations of the object instance received on other planes are prominently displayed. In order to receive the object instance to be focused on, the user can click the object instance to be focused on. In the embodiment, the locations can be prominently displayed by using different colors, grays, patterns, etc., and the present invention has no limitation on this as long as the object instance selected can be prominently displayed with respect to other object instances in the same plane.

Figure 5:
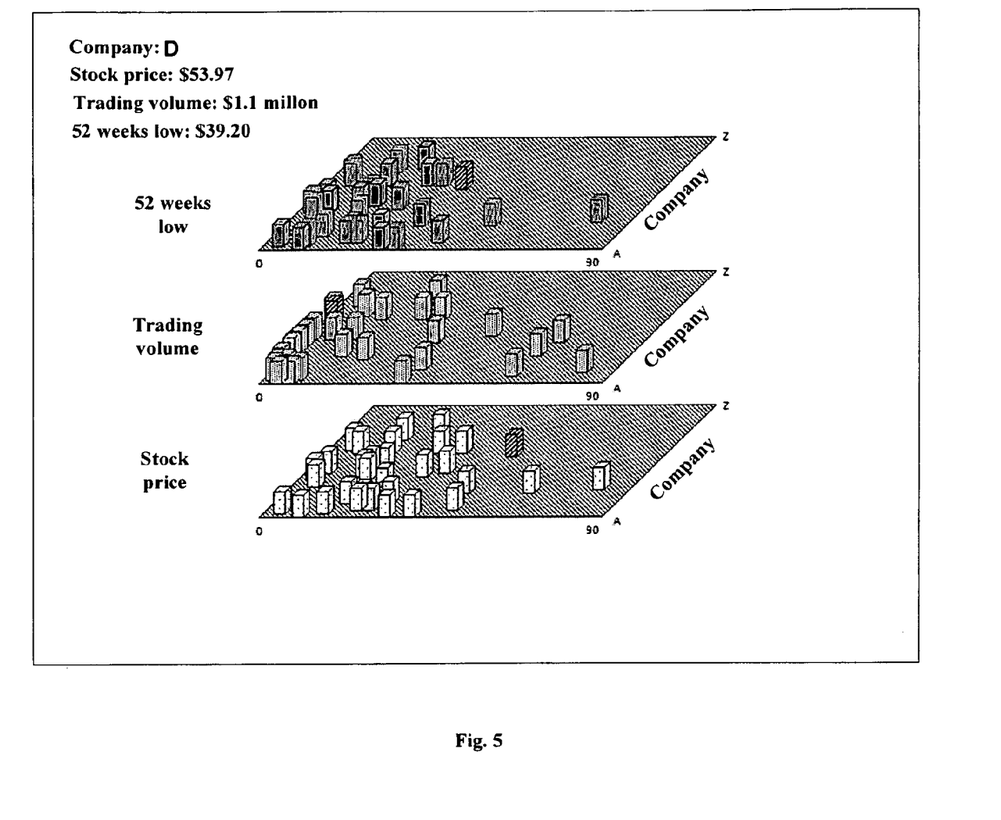
FIG. 5 is another example of a view obtained by a visualization method and apparatus for multidimensional data according to the present invention.

For example, FIG. 5 is another example of a view obtained by the visualization method for multidimensional data according to the present invention. As shown in FIG. 5, if the plane of 52 weeks low is determined as the interested plane, while 52 weeks low of $39.20 of the stock of company D is clicked in the plane, the location of the stock of company D on the plane of the daily trading volume (1.1 million) and the location of the stock of company D on the plane of the price of the stock ($53.94) are prominently displayed by using a post with slash.

It should be noted that although the examples of FIGS. 2-5 are described above by using the stock as an example, the object of the present invention is not limited to the stock, and it can be other financial tools (such as funds, bonds, currencies, futures and so on), all kinds of goods (such as books, computers, and so on), or companies in a field, and so on.

Through the visualization method for multidimensional data according to the present embodiment, multidimensional data can be displayed in different layers in a window or screen and it can be linked and displayed. Therefore, the relationship among different parameters of multidimensional data can be intuitionally displayed to the user, and the user can accurately and efficiently use and analyze various information. Moreover, if the method of the embodiment is applied to a financial market, it can help the user to accurately analyze movements and trends of the financial market, and reduce the investment risk of the user.

Moreover, in the method of the embodiment, while the user focuses on an object instance, a parameter value of a parameter to be viewed of the object instance can be linked and displayed; therefore, the object instance interested by the user can be accurately found in a plane, and efficiency is thereby increased.

Visualization Apparatus for Multidimensional Data

Figure 6:
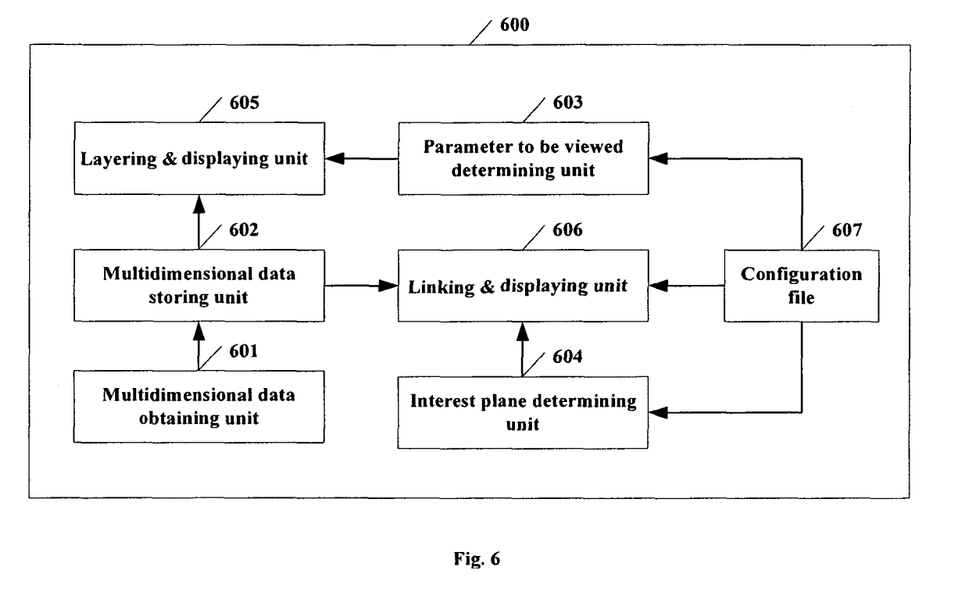
FIG. 6 is a block diagram showing a visualization apparatus for multidimensional data according to the present invention.

FIG. 6 is a block diagram showing a visualization apparatus for multidimensional data according to the present invention. Next, the embodiment will be described in conjunction with FIG. 6. For those same parts as the above embodiment, the description of which will be properly omitted.

As shown in FIG. 6, the visualization apparatus 600 for multidimensional data according to the embodiment comprises a layering and displaying unit 605, an interested plane determining unit 604, and a linking and displaying unit 606, and an optional parameter to be viewed determining unit 603, an optional multidimensional data obtaining unit 601, an optional multidimensional data storing unit 602, and an optional configuration file 607.

With respect to a given object, parameters to be viewed are determined by the parameter to be viewed determining unit 603 from a plurality of parameters related to the given object, wherein the parameters to be viewed are parameters that a user is interesting in. In the embodiment, parameters that the user is interesting in and are to be viewed are selected by the parameter to be viewed determining unit 603 from the plurality of parameters related to the given object as the parameters to be viewed.

In the embodiment, some parameters are selected from a plurality of preset parameters by a user by a GUI (Graphical User Interface) as the parameters to be viewed by the parameter to be viewed determining unit 603. Further, the parameters to be viewed can be stored in the configuration file 607, and as it is required by the parameter to be viewed determining unit 603, the parameters to be viewed are automatically read from the configuration file 607, wherein the configuration file 607 can be edited and stored by the user in advance. The present invention has no limitation on the method of determining the parameters to be viewed of the parameter to be viewed determining unit 603, and it can be realized by any method known by those skilled in the art.

In the embodiment, the parameter to be viewed determining unit 603 is an optional unit, and in the visualization apparatus 600 for multidimensional data of the present invention, there is no need to select the parameters to be viewed from the plurality of parameters related to the given object, but all parameters related to the given object are used as the parameters to be viewed.

The parameters to be viewed determined by the parameter to be viewed determining unit 603 are displayed in different layers along a Z axis of a 3-D coordinate system by the layering and displaying unit 605, wherein each of the parameters is displayed in a 2-D plane.

In the embodiment, the multidimensional data are obtained by the multidimensional data obtaining unit 601, and the multidimensional data obtained by the multidimensional data obtaining unit 601 can be stored in the multidimensional data storing unit 602, wherein each dimension data are stored in one list or multidimensional data are stored in one list. A set of data corresponding to each of the parameters to be viewed are read from the list stored in the multidimensional data storing unit 602 according to the parameters to be viewed determined by the parameter to be viewed determining unit 603, each set of data are drawn on a 2-D plane, and the drawn 2-D planes are displayed in different layers along the Z axis of the 3-D coordinate system in one window or screen by the layering and displaying unit 605. It should be understood that in the present invention, any suitable software known by those skilled in the art can be used to draw a set of data on a 2-D plane, the drawn 2-D planes are displayed in different layers along the Z axis of the 3-D coordinate system in one window by these software, and the present invention has no limitation on this.

The layering and displaying unit 605 will be described in detail in conjunction with FIG. 2. FIG. 2 is an example of a view obtained by a visualization apparatus for multidimensional data according to the present invention. As shown in FIG. 2, a stock is used as an example of the object, and price of the stock, daily trading volume and 52 weeks low on a certain day are selected as the parameters to be viewed. Three parameters are respectively displayed on three planes top-to-down by the layering and displaying unit 605, wherein every post represents a value of a parameter corresponding to an object instance. The X axes respectively denote price of the stock (0-$90), daily trading volume (0-90 million), 52 weeks low (0-$90), and the Y axes denote an object instance, i.e., a name of a company (arranged by the order of letters from A to Z). In the embodiment, a post is used to represent the value of a parameter of an object instance in order that object instances can be easily differentiated in a 2-D plane, and other patterns such as a centrum, a triangle etc. can be used in the present invention.

Furthermore, optionally, the visualization apparatus 600 for multidimensional data according to the embodiment further comprises an equalizing unit configured to equalize the determined parameters to be viewed can be equalized before the display configuration is performed by the layering and displaying unit 605. For example, the price of the stock, daily trading volume, and 52 weeks low of the instance shown in FIG. 2 can be equalized, in order to uniformly distribute them in the figure when displaying them. In the embodiment, any suitable method or software known by those skilled in the art can be used to perform the equalizing, for example the value of the parameter of the object instance can be multiplied by a weight or treated by using a function.

Return to FIG. 6, a plane is determined by the interested plane determining unit 604 as an interested plane. A plane can be selected in a displayed screen as the interested plane by the user by using the interested plane determining unit 604 or the interested plane can be stored in the configuration file 607 and as it is required by the interested plane determining unit 604, the interested plane can be automatically read from the configuration file 607, wherein the configuration file 607 can be edited and stored in advance by the user. For example, in the example of FIG. 2, the plane corresponding to price of the stock can be selected as the interested plane.

In response to focusing on an object instance of the object in the interested plane selected by the user, locations of the object instance on other planes are linked and displayed by the linking and displaying unit 606.

The linking and displaying unit 606 will be described in detail in conjunction with FIGS. 2-5.

As shown in FIG. 2, after the plane corresponding to price of the stock is determined as the interested plane by the interested plane determining unit 604, the user can drag the plane with respect to a coordinate plane forward to backward and left to right. As shown in FIG. 2, a plane, which is vertical with the three planes displayed in different layers and angled (e.g., vertical) with the paper plane, is used as the coordinate plane. A longitudinal axis of the coordinate plane is corresponding to the Z axis of the 3-D coordinate system, and a lateral axis of the coordinate plane is each line crossed with each of the three planes displayed in different layers, in which a point of intersection between the longitudinal axis and each lateral axis is a coordinate origin of the coordinate plane on the plane on which the lateral axis is located.

In the embodiment, the user can move the interested plane forward to backward and left to right with respect to the coordinate origin of the coordinate plane on the interested plane by using the linking and displaying unit 606, in order to focus the object instance interested by the user on the coordinate origin. For example, in FIG. 2, the user focuses on the stock of company A, i.e., the location of the stock of company A on the interested plane is moved to the coordinate origin of the coordinate plane on the plane of price of the stock.

At the same time, in the embodiment, the locations of the object instance on other planes are linked and displayed by the linking and displaying unit 606. That is to say, while the use moves the interested plane, the other planes are automatically moved by the linking and displaying unit 606, i.e., the plane of daily trading volume and the plane of 52 weeks low are moved in order that the locations of the stock of company A on the plane of daily trading volume and the plane of 52 weeks low are move to the coordinate origins of the coordinate plane on these planes respectively, i.e., the stock of company A in the plane of daily trading volume and the plane of 52 weeks low are move to the coordinate origins of the coordinate plane on these planes.

Further, optionally, in the embodiment, while the interested plane is moved, a parameter value of a parameter to be viewed of an object instance on the coordinate origin can be linked and displayed. For example, in FIG. 2, when the object instance on the coordinate origin is the stock of company A, the company of company A, price of the stock of $33.6, daily trading volume of 66.3 million, and 52 weeks low of $26.71 are linked and displayed on up-left corner of the window.

Optionally, the plane on which daily trading volume is located can be used as the interested plane. Based on FIG. 2, a view as shown in FIG. 3 is obtained by moving the plane of daily trading volume with respect to the coordinate plane, and moving the object instance to the stock of company B. As shown in FIG. 3, while the daily trading volume of the stock of company B is moved to 12.5 million, the price of the stock of company B is moved to $85.18, and the 52 weeks low of the stock of company B is moved to $80.20.

In the embodiment, in step 104, although the interested plane is moved by the linking and displaying unit 606 to focus on an object instance, however, the present invention has no limitation on this, and the coordinate plane can be moved to focus on an object instance. For example, based on FIG. 2, a view as shown in FIG. 4 can be obtained by selecting the plane of the price of the stock as the interested plane, and moving the coordinate plane to the right with respect to the interested plane, so as to focus the coordinate origin on the stock of company C the price of which is $39.33. As shown in FIG. 4, while the price of the stock of company C is moved to $39.33, the daily trading volume of the stock of company C is moved to 11.2 million, and the 52 weeks low of the stock of company C is moved to $18.87.

In response to focusing on an object instance in the interested plane selected by the user, locations of the object instance on other planes is linked and displayed by the linking and displaying unit 606 by moving the interested plane and other planes or moving the coordinate plane and other planes, however, the present invention has no limitation on this, and the present invention can be accomplished in the case that there is not a coordinate plane and there is no need to move planes of parameters to be viewed. Specifically, in the present invention, the linking and displaying unit 606 further comprises a receiving unit and a prominently displaying unit, wherein an object instance to be focused on is received by the receiving unit on the interested plane determined by the interested plane determining unit 604, and locations of the object instance selected on other planes are prominently displayed. In order to receive the object instance to be focused on by the receiving unit, the user can click the object instance to be focused on. In the embodiment, the locations can be prominently displayed by using different colors, grays, or patterns, and the present invention has no limitation on this as long as the object instance selected can be prominently displayed with respect to other object instances in the same plane.

For example, FIG. 5 is another example of a view obtained by the visualization method for multidimensional data according to the present invention. As shown in FIG. 5, if the plane of 52 weeks low is determined as the interested plane, while 52 weeks low of $39.20 of the stock of company D is clicked in the plane, the location of the stock of company D on the plane of the daily trading volume (1.1 million) and the location of the stock of company D on the plane of the price of the stock ($53.94) are prominently displayed by using a post with slash.

Moreover, the linking and displaying manner of the linking and displaying unit 606 can be stored in the configuration file 607, and as the displaying is performed, a displaying manner can be automatically read from the configuration file 607.

It should be noted that although the examples of FIGS. 2-5 are described above by using the stock as an example, the object of the present invention is not limited to the stock, and it can be other financial tools (such as funds, bonds, currencies, futures and so on), all kinds of goods (such as books, computers and so on), or companies of a field and so on. Further, the visualization apparatus for multidimensional data according to the present invention can be used as a system of displaying financial market information.

Unless otherwise mentioned, the functions of the apparatus and unit of the present invention can be implemented by hardware or software or combination thereof. Further, these functions can be performed by a processor such as a computer or an electronic data processor with an integrated circuit coded, such as coded with a computer program. Generally, the method for implementing the embodiment of the present invention can be a part of an operating system or a specific application program, a program, a module, an object or an instruction sequence. The software of the present invention generally includes a plurality of instructions which can be converted by a local computer into machine readable instructions, thereby they are executable instructions. Furthermore, the program includes variables and a data structure which are kept in local or searched in a memory with respect to the program. Further, the programs mentioned below can be identified based on application methods for implementing them in the specific embodiment of the present invention.

Through the visualization apparatus for multidimensional data according to the present embodiment, multidimensional data can be displayed in different layers in a window or screen and it can be linked and displayed. Therefore, the relationship among different parameters of multidimensional data can be intuitionally displayed to the user, and the user can accurately and efficiently use and analyze various information. Moreover, if the method of the embodiment is applied to a financial market, it can help the user to accurately analyze movements and trends of the financial market, and reduce the investment risk of the user.

Moreover, in the apparatus of the embodiment, while the user focuses on an object instance, a parameter value of a parameter to be viewed of the object instance can be linked and displayed; therefore, the object instance interested by the user can be accurately found in a plane, and efficiency is thereby increased.

Although a visualization method for multidimensional data and a visualization apparatus for multidimensional data of the present invention has been described in detail through some exemplary embodiments, these embodiments are not exhaustive, various variations and modifications can be made therein by those skilled in the art without departing from the spirit and scope of the invention. Therefore, the present invention is not limited to these embodiments, the scope of which is only defined by accompany claims.

The invention claimed is:

1. A visualization method for multidimensional data including a plurality of parameters to be viewed which are related to a given object, comprising:
displaying each of the plurality of parameters in relation to a plurality of object instances each in a 2-D plane thereby forming a plurality of 2-D planes, wherein each parameter has a plurality of values, wherein each x-axis parameter for each 2-D plane is different from each of the other of the plurality of x-axis parameters and each y-axis parameter for each 2-D plane is the same as each of the other of the plurality of y-axis parameters, wherein the x-axis parameter represents one of a plurality of financial market parameters, wherein each financial market parameter's value has one of a plurality of companies corresponding to it, and wherein the y-axis parameter represents the plurality of companies, and wherein each point in each 2-D plane is one value of each parameter and one object instance of a plurality of object instances;
displaying the plurality of 2-D planes to be viewed which are related to a given object in different layers along a Z axis of a 3-D coordinate system, wherein the Z axis links a same object instance occurring in each of the 2-D planes, and wherein all of the 2-D planes are separate from each other and parallel to each other;
determining one of the 2-D planes as an interested plane; and in response to a user focusing on a specific object instance in the interested plane, linking and displaying locations of the specific object instance on the other 2-D planes that are separate from and parallel to each of the other 2-D planes along the Z axis.

2. The visualization method according to claim 1, wherein linking and displaying locations of the object instance on other planes comprises:
moving the interested plane relative to a coordinate plane to move a location of an object instance to be focused on by a user on the interested plane to a coordinate origin of the coordinate plane on the interested plane; and
simultaneously moving the other planes to move locations of the object instance on the others planes to coordinate origins of the coordinate plane on the other planes.

3. The visualization method according to claim 1, wherein linking and displaying locations of the object instance on other planes comprises:
moving a coordinate plane relative to the interested plane to move a location of an object instance to be focused on by a user on the interested plane to a coordinate origin of the coordinate plane on the interested plane; and
simultaneously moving the other planes to move locations of the object instance on the others planes to coordinate origins of the coordinate plane on the other planes.

4. The visualization method according to claim 1, wherein linking and displaying locations of the object instance on other planes comprises:
receiving an object instance to be focused on by a user in the interested plane; and
prominently displaying locations of the object instance on other planes.

5. The visualization method according to claim 2, wherein linking and displaying locations of the object instance on other planes comprises:
in response to focusing on an object instance of the object by a user, linking and displaying values of the parameters to be viewed of the object instance.

6. The visualization method according to claim 1, further comprising:
determining the parameters to be viewed from a plurality of parameters related to the given object for the given object before displaying the parameters to be viewed which are related to a given object in different layers along a Z axis of a 3-D coordinate system.

7. The visualization method according to claim 1, further comprising:
equalizing the parameters to be viewed before displaying the plurality of parameters to be viewed which are related to a given object in different layers along a Z axis of a 3-D coordinate system.

8. A visualization apparatus for multidimensional data including a plurality of parameters to be viewed which are related to a given object, comprising:
a layering and displaying unit configured to:
display each of the plurality of parameters in relation to a plurality of object instances each in a 2-D plane thereby forming a plurality of 2-D planes, wherein each parameter has a plurality of values, wherein each x-axis parameter for each 2-D plane is different from each of the other of the plurality of x-axis parameters and each y-axis parameter for each 2-D plane is the same as each of the other of the plurality of y-axis parameters, wherein the x-axis parameter represents one of a plurality of financial market parameters, wherein each financial market parameter's value has one of a plurality of companies corresponding to it, and wherein the y-axis parameter represents the plurality of companies, and wherein each point in each 2-D plane is one value of each parameter and one object instance of a plurality of object instances;
display the plurality of 2-D planes to be viewed which are related to a given object in different layers along a Z axis of a 3-D coordinate system, wherein the Z axis links a same object instance occurring in each of the 2-D planes, and wherein all of the 2-D planes are separate from each other and parallel to each other;
an interested plane determining unit configured to determine one of the 2-D planes as an interested plane; and
a linking and displaying unit configured to, in response to a user focusing on a specific object instance in the interested plane, link and display locations of the specific object instance on the other 2-D planes that are separate from and parallel to each of the other 2-D planes along the Z axis.

9. The visualization apparatus according to claim 8, wherein the linking and displaying unit is configured to:
move the interested plane relative to a coordinate plane to move a location of an object instance to be focused on by a user on the interested plane to a coordinate origin of the coordinate plane on the interested plane; and
simultaneously move the other planes to move locations of the object instance on the others planes to coordinate origins of the coordinate plane on the other planes.

10. The visualization apparatus according to claim 8, wherein the linking and displaying unit is configured to:
move a coordinate plane relative to the interested plane to move a location of an object instance to be focused on by a user on the interested plane to a coordinate origin of the coordinate plane on the interested plane; and
simultaneously move the other planes to move locations of the object instance on the others planes to coordinate origins of the coordinate plane on the other planes.

11. The visualization apparatus according to claim 8, wherein the linking and displaying unit comprises:
a receiving unit configured to receive an object instance to be focused on by a user in the interested plane; and
a displaying unit configured to prominently display locations of the object instance on other planes.

12. The visualization apparatus according to claim 9, wherein the linking and displaying unit is further configured to:
in response to focusing on an object instance of the object by a user, link and display values of the parameters to be viewed of the object instance.

13. The visualization apparatus according to claim 8, further comprising:
a determining unit configured to, before the parameters to be viewed which are related to a given object are displayed by the layering and displaying unit in different layers along a Z axis of a 3-D coordinate system, determine the parameters to be viewed from a plurality of parameters related to the given object for the given object.

14. The visualization apparatus according to claim 8, further comprising:
an equalizing unit configured to equalize the parameters to be viewed before the plurality of parameters to be viewed which are related to a given object are displayed by the layering and displaying unit in different layers along a Z axis of a 3-D coordinate system.

* * * * *